United States Patent
Pucci et al.

(10) Patent No.: US 7,838,609 B2
(45) Date of Patent: Nov. 23, 2010

(54) POLYVINYL ALCOHOL TYPE RESIN, MONOLAYER FILM AND LAMINATE

(75) Inventors: Mark Pucci, Elk Grove Village, IL (US); Mariko Hori, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 946 days.

(21) Appl. No.: 11/708,945

(22) Filed: Feb. 21, 2007

(65) Prior Publication Data

US 2008/0200633 A1    Aug. 21, 2008

(51) Int. Cl.
*C08F 216/02*    (2006.01)
*C08F 32/08*    (2006.01)

(52) U.S. Cl. ............... 526/307.5; 526/280; 526/281

(58) Field of Classification Search ............... 526/307.5, 526/280, 281
See application file for complete search history.

(56) References Cited

U.S. PATENT DOCUMENTS 6,686,429 B2 *    2/2004    Dammel et al. ............ 526/297

FOREIGN PATENT DOCUMENTS

| JP | 9-127643 | 5/1997 |
|---|---|---|
| JP | 2004-529245 | 9/2004 |
| JP | 2005-536600 | 12/2005 |

OTHER PUBLICATIONS

Toyoshima, "Polyvinyl Alcohol", Ed. by C.A. Finch, John Wiley & Sons, 1973, pp. 339-389.
Iwanami, et al., "Ethylene vinyl alcohol resins for gas-barrier material", Tappi Jornal, vol. 66, No. 10, Oct. 1983, pp. 85-90.

* cited by examiner

*Primary Examiner*—Ling-Siu Choi
(74) *Attorney, Agent, or Firm*—Hamre, Schumann, Mueller & Larson, P.C.

(57) ABSTRACT

A polyvinyl alcohol type resin, which renders possible preparation of a packaging material having high gas barrier property under a high humidity condition even as a monolayer film, is provided. The polyvinyl alcohol (PVA) type resin of the invention has at least a PVA structural unit and also has an alicyclic structural unit in the main chain. A monolayer film containing this PVA type resin and a laminate containing at least one layer comprising this PVA type resin can be used as a packaging material which shows high gas barrier property even under a high humidity condition.

10 Claims, 1 Drawing Sheet

POLYVINYL ALCOHOL TYPE RESIN, MONOLAYER FILM AND LAMINATE

BACKGROUND OF THE INVENTION

1. Field of the Invention

This invention relates to a novel polyvinyl alcohol type resin, a monolayer film which comprises this resin, and a laminate that comprises at least one layer comprising this resin.

2. Description of the Related Art

In order to prevent deterioration or putrefaction of food, chemicals and the like caused by oxygen and the like in the air, gas barrier property (particularly oxygen barrier property) are required for their packaging material. Though polyvinyl alcohol resin (to be referred also to as PVA hereinafter) which has excellent gas barrier property, transparency, scent keeping property and the like is used as such a packaging material, being soluble in water, gas barrier property of PVA is insufficient as a packaging material for moist products (e.g., see Non-patent Reference 1).

An ethylene-vinyl alcohol copolymer (to be referred also to as EVOH hereinafter) prepared by copolymerizing PVA with ethylene is also used for the purpose of improving water resistance, but it cannot be said that an EVOH single film is sufficient as a packaging material because its gas barrier property is reduced under a high humidity condition (e.g., see Non-patent Reference 2).

In order to keep gas barrier property at a high level even under a high humidity condition, a laminate in which both sides of an EVOH film are laminated with a water-resistant resin or the like has been put into practical use, but this material is economically disadvantageous because not only the materials are increased but also labor for the laminating treatment is increased.

[Non-patent Reference 1] K. Toyoshima, "Polyvinyl Alcohol" Ed. by C. A. Finch, John Wiley & Sons, 1973, 339

[Non-patent Reference 2] T. Iwanami and Y. Hirai, "Tappi J.", 1983, 66(10), 85

SUMMARY OF THE INVENTION

The invention aims at providing a polyvinyl alcohol type resin which renders possible preparation of a packaging material having high gas barrier property under a high humidity condition even as a monolayer film.

The present inventors have conducted intensive studies taking the aforementioned situations and found as a result that a PVA type resin in which reduction of gas barrier property is controlled even under high humidity can be obtained by introducing an alicyclic structural unit into the main chain of a polyvinyl alcohol type resin (to re referred also to as PVA type resin hereinafter) having a vinyl alcohol structural unit. In addition, it was found also that a monolayer film which comprises this PVA type resin and a laminate that comprises at least one layer comprising this PVA type resin can become packaging materials having high gas barrier property even under a high humidity condition.

The constitution of the present invention is set forth below.

1. A polyvinyl alcohol type resin, which comprises: a vinyl alcohol structural unit; and an alicyclic structural unit containing an alicyclic structure in the main chain.

2. The polyvinyl alcohol type resin according to the item 1, wherein the alicyclic structural unit is a bicyclo compound unit.

3. The polyvinyl alcohol type resin according to the item 1 or 2, wherein the carbon number of the alicyclic structural unit is from 3 to 20.

4. The polyvinyl alcohol type resin according to any one of the items 1 to 3, wherein a ring having the smallest carbon number in the alicyclic structural unit is 3- to 10-membered ring.

5. The polyvinyl alcohol type resin according to the item 1, wherein the alicyclic structural unit is a structural unit derived from bicyclo[2.2.1]hept-2-ene.

6. The polyvinyl alcohol type resin according to any one of the items 1 to 5, wherein the content of the alicyclic structural unit in the resin is from 0.1 to 40% by mol based on the total amount of monomer structural units in the resin.

7. The polyvinyl alcohol type resin according to any one of the items 1 to 6, which further comprises an ethylene structural unit.

8. The polyvinyl alcohol type resin according to the item 7, wherein the content of the ethylene structural unit in the resin is from 1 to 70% by mol based on the total amount of monomer structural units in the resin.

9. A monolayer film, which comprises the polyvinyl alcohol type resin according to any one of the items 1 to 8.

10. A laminate which comprises at least one layer comprising the polyvinyl alcohol type resin according to any one of the items 1 to 8.

The reason why the PVA type resin of the invention has excellent gas barrier property even under a high humidity condition is not clear, but it is considered that this is because glass transition point (Tg) is increased by the introduction of an alicyclic structural unit, plasticization effect of water by moisture absorption is inhibited thereby, and motility of molecules in the amorphous region is reduced thereby.

In this connection, the term "PVA type resin" as used herein includes not only PVA but also copolymers of PVA with other copolymerizable components.

Since the PVA type resin of the invention has high gas barrier property even under a high humidity condition, it can be suitably used as a packaging material for food, chemicals and the like even in the form of a monolayer film. In addition, the laminate which comprises at least one layer comprising the PVA type resin of the invention is suitable as a packaging material for an article whose quality could be deteriorated by oxygen because of its ability to control reduction of gas barrier property and provide mechanical strength.

DETAILED DESCRIPTION OF THE INVENTION

Figure 1:
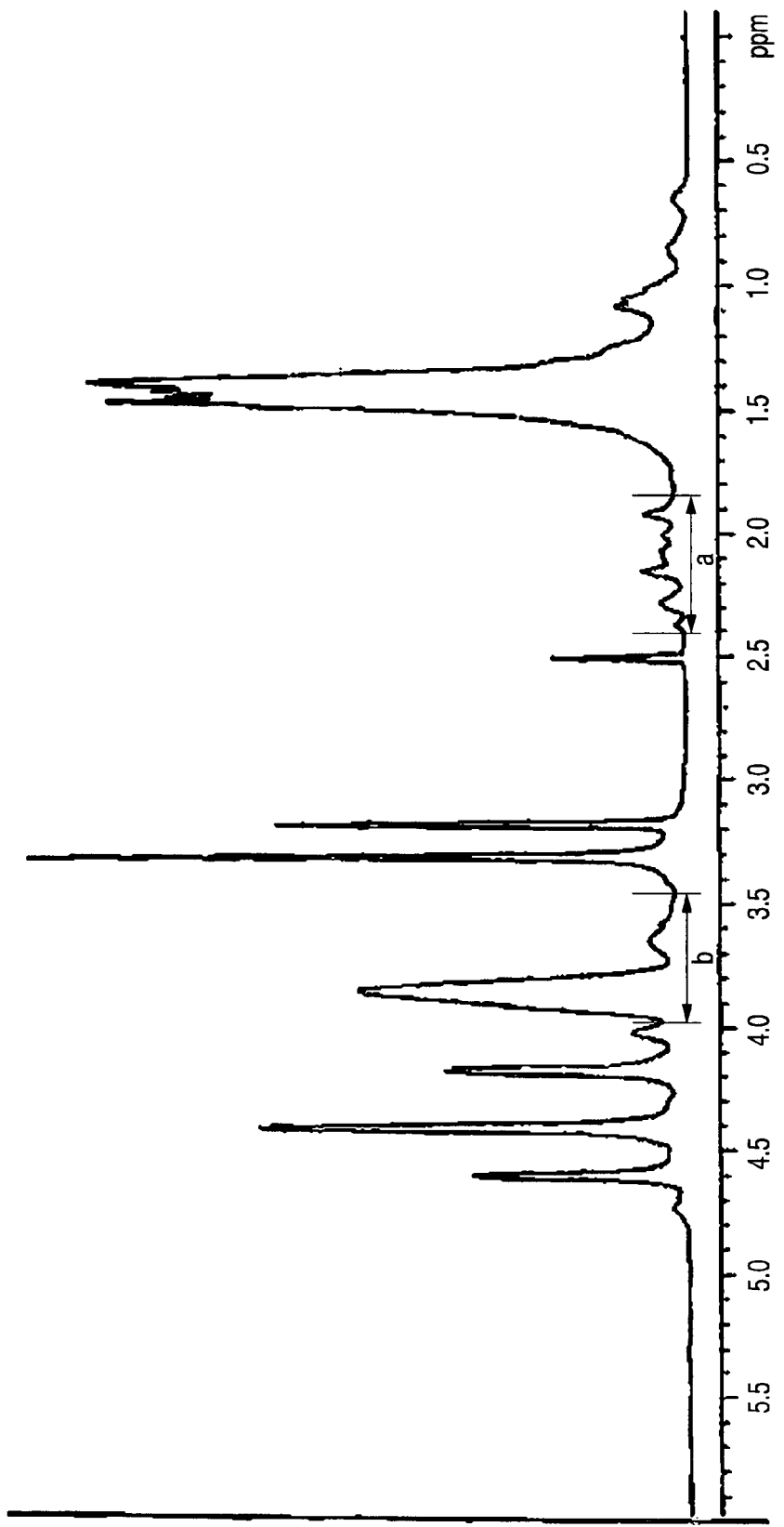
FIG. 1 is a chart of $^1$H-NMR of the PVA type resin of Inventive Example 1.

The following describes the invention further in detail. The PVA type resin of the invention is characterized in that it has an alicyclic structural unit in the main chain of the polyvinyl alcohol type resin. Respective composing elements of the invention are described in the following.

[Vinyl Alcohol Structural Unit]

The PVA type resin of the invention at least has a vinyl alcohol structural unit. The vinyl alcohol structural unit is a structural unit derived from a vinyl ester type monomer. As the vinyl ester type monomer, vinyl formate, vinyl acetate, vinyl propionate, vinyl valerate, vinyl butyrate, vinyl isobutyrate, vinyl pivalate, vinyl caprylate, vinyl laurate, vinyl stearate, vinyl benzoate, vinyl versatate and the like can be exemplified, of which vinyl acetate is suitably used from the economical point of view.

[Alicyclic Structural Unit]

The PVA type resin of the invention has an alicyclic structural unit containing an alicyclic structure in the main chain. Such an alicyclic structural unit is derived from a compound (monomer) having 3 or more carbon atoms and having an unsaturated bond in the ring. The compound may be a monocyclic compound consisting of only a single ring, or a condensed-ring compound which does not have a free spiro bond in the compound. Such a condensed-ring compound means that it consists of two or more ring and has a structure formed by sharing only a chain, which contains at least one carbon, of each ring in the compound with the next ring, and moreover by lining up of rings constituting the compound. In terms of condensed-ring compound, the cyclic compound that has two rings is bicyclo compound, and the cyclic compound that has three rings is tricyclo compound, and the cyclic compound that has four rings is tetracyclo compound, and other cyclic compounds that have more rings could be used and named in the same way. Regarding the alicyclic structural unit, particularly preferred is a condensed-ring compound structural unit.

The number of carbons of the aforementioned the alicyclic structural unit is generally from 3 to 20, preferably from 4 to 12, particularly preferably from 5 to 10. Also, the structure of a ring in which the number of carbons is smallest is generally from 3- to 10-membered ring, preferably from 3- to 6-membered ring, particularly preferably 5- or 6-membered ring.

Within a range which does not spoil the gist of the invention, these rings may have substituent groups such as alkyl group, cycloalkyl group and the like saturated hydrocarbon radicals, phenyl group and the like aromatic hydrocarbon radicals, alkylidene groups and hydrocarbon radicals generalizing them, alkoxy group, nitro group, amino group, cyano group and complex groups thereof. These compounds have generally from 1 to 3 substituent groups, preferably 1 substituent group, and in this case, a group which does not generate carboxyl group at the saponification step which is described later is particularly desirable. Such a substituent group is not limited, but is generally a saturated hydrocarbon radical having from 1 to 6 carbon atoms, preferably an alkyl group having from 1 to 4 carbon atoms. In addition, the aforementioned compound may contain nitrogen atom, boron atom, phosphorus atom, oxygen atom, sulfur atom or the like hetero atom, in the ring.

Illustrative examples of the monocyclic compound include cyclopropene, 3-methylcyclopropene, 3-methoxycyclopropene, 3-cyanocyclopropene, 3-aminocyclopropene, 3-nitrocyclopropene and the like cyclopropene derivatives; cyclobutene, 3-methylcyclobutene, 3-methoxycyclobutene, 3-cyanocyclobutene, 3-aminocyclobutene, 3-nitrocyclobutene and the like cyclobutene derivatives; cyclopentene, 3-methylcyclopentene, 3-methoxycyclopentene, 3-cyanocyclopentene, 3-aminocyclopentene, 3-nitrocyclopentene, 4-methylcyclopentene, 4-methoxycyclopentene, 4-cyanocyclopentene, 4-aminocyclopentene, 4-nitrocyclopentene and the like cyclopentene derivatives; and cyclohexene, 3-methylcyclohexene, 3-methoxycyclohexene, 3-cyanocyclohexene, 3-aminocyclohexene, 3-nitrocyclohexene, 4-methylcyclohexene, 4-methoxycyclohexene, 4-ethoxycyclohexene, 4-cyanocyclohexene, 4-aminocyclohexene, 4-nitrocyclohexene and the like cyclohexene derivatives.

Examples of the condensed-ring compound include;

Examples of the bicyclo compound include bicyclo[2.1.0]pent-2-ene, 5-methylbicyclo[2.1.0]pent-2-ene and the like bicyclo[2.1.0]pent-2-ene derivatives, bicyclo[2.1.1]hex-2-ene, 5-methylbicyclo[2.1.1]hex-2-ene, and the like bicyclo[2.1.1]hex-2-ene derivatives, as well as bicyclo[2.2.1]hept-2-ene and 1-methylbicyclo[2.2.1]hept-2-ene, 5-methylbicyclo[2.2.1]hept-2-ene, 7-methylbicyclo[2.2.1]hept-2-ene, 5-ethylbicyclo[2.2.1]hept-2-ene, 5-n-butylbicyclo[2.2.1]hept-2-ene, 5-isobutylbicyclo[2.2.1]hept-2-ene and the like saturated hydrocarbon radical-mono-substituted bicyclo[2.2.1]hept-2-enes, 5-phenyl-bicyclo[2.2.1]hept-2-ene, 5-benzyl-bicyclo[2.2.1]hept-2-ene, 5-tolyl-bicyclo[2.2.1]hept-2-ene and the like aromatic hydrocarbon radical-mono-substituted bicyclo[2.2.1]hept-2-enes and hydrocarbon radical-mono-substituted bicyclo[2.2.1]hept-2-enes thereof, 5-methoxybicyclo[2.2.1]hept-2-ene, 5-ethoxybicyclo[2.2.1]hept-2-ene, 5-cyanobicyclo[2.2.1]hept-2-ene, 5-aminobicyclo[2.2.1]hept-2-ene, 5-nitrobicyclo[2.2.1]hept-2-ene and the like and mono-substituted bicyclo[2.2.1]hept-2-enes thereof, 5,6-dimethylbicyclo[2.2.1]hept-2-ene the like hydrocarbon radical-di-substituted bicyclo[2.2.1]hept-2-enes, 5-methyl-5-phenylbicyclo[2.2.1]hept-2-ene, 5-(isopropylphenyl)-bicyclo[2.2.1]hept-2-ene, 5-(biphenyl)-bicyclo[2.2.1]hept-2-ene, (β-naphthyl)-bicyclo[2.2.1]hept-2-ene, 5-(anthracenyl)-bicyclo[2.2.1]hept-2-ene, 5,6-diphenyl-bicyclo[2.2.1]hept-2-ene and the like aromatic hydrocarbon-di-substituted bicyclo[2.2.1]hept-2-enes and hydrocarbon-di-substituted bicyclo[2.2.1]hept-2-enes thereof, 5,6-dimethoxybicyclo[2.2.1]hept-2-ene, 5,6-diethoxybicyclo[2.2.1]hept-2-ene and the like di-substituted bicyclo[2.2.1]hept-2-enes, bicyclo[2.2.1]hept-2-ene derivatives thereof, and bicyclo[3.2.0]hept-2-enes, bicyclo[3.2.1]hept-2-enes and the like.

Examples of the tricyclo compound include tricyclo[4.3.0.1$^{2.5}$]-3-decene, 7-methyltricyclo[4.3.0.1$^{2.5}$]-3-decene, 8-methyltricyclo[4.3.0.1$^{2.5}$]-3-decene, 7-methoxytricyclo[4.3.0.1$^{2.5}$]-3-decene, 8-methoxytricyclo[4.3.0.1$^{2.5}$]-3-decene, 7-ethoxytricyclo[4.3.0.1$^{2.5}$]-3-decene, 8-ethoxytricyclo[4.3.0.1$^{2.5}$]-3-decene 7-cyanotricyclo[4.3.0.1$^{2.5}$]-3-decene, 8-cyanotricyclo[4.3.0.1$^{2.5}$]-3-decene 7-aminotricyclo[4.3.0.1$^{2.5}$]-3-decene, 8-aminotricyclo[4.3.0.1$^{2.5}$]-3-decene 7-nitrotricyclo[4.3.0.1$^{2.5}$]-3-decene 8-nitrotricyclo[4.3.0.1$^{2.5}$]-3-decene and the like tricyclo[4.3.0.1$^{2.5}$]-3-decene derivatives, tricyclo [4.4.0.1$^{2.5}$]-3-undecene, 8-methyltricyclo[4.4.0.1$^{2.5}$]-3-undecene, 8-methoxytricyclo[4.4.0.1$^{2.5}$]-3-undecene, 8-ethoxytricyclo[4.4.0.1$^{2.5}$]-3-undecene, 8-cyanotricyclo[4.4.0.1$^{2.5}$]-3-undecene, 8-aminotricyclo[4.4.0.1$^{2.5}$]-3-undecene, 8-nitrotricyclo[4.4.0.1$^{2.5}$]-3-undecene and the like tricyclo[4.4.0.1$^{2.5}$]-3-undecene derivatives.

Examples of the tetracyclo compound include tetracyclo[4.4.0.1$^{2.5}$.1$^{7.10}$]-3-dodecene 8-methyltetracyclo[4.4.0.1$^{2.5}$.1$^{7.10}$]-3-dodecene, 8-methoxytetracyclo[4.4.0.1$^{2.5}$.1$^{7.10}$]-3-dodecene, 8-ethoxytetracyclo[4.4.0.1$^{2.5}$.1$^{7.10}$]-3-dodecene, 8-cyanotetracyclo[4.4.0.1$^{2.5}$.1$^{7.10}$]-3-dodecene, 8-aminotetracyclo[4.4.0.1$^{2.5}$.1$^{7.10}$]-3-dodecene, 8-nitrotetracyclo[4.4.0.1$^{2.5}$.1$^{7.10}$]-3-dodecene, 8-ethyltetracyclo[4.4.0.1$^{2.5}$.1$^{7.10}$]-3-dodecene, 8-butyltetracyclo[4.4.0.1$^{2.5}$.1$^{7.10}$]-3-dodecene, 8-isobutyltetracyclo[4.4.0.1$^{2.5}$.1$^{7.10}$]-3-dodecene, 8-hexyltetracyclo[4.4.0.1$^{2.5}$.1$^{7.10}$]-3-dodecene, 8-cyclohexyltetracyclo[4.4.0.1$^{2.5}$.1$^{7.10}$]-3-dodecene, 8-stearyltetracyclo[4.4.0.1$^{2.5}$.1$^{7.10}$]-3-dodecene, 7,8-dimethyltetracyclo[4.4.0.1$^{2.5}$.1$^{7.10}$]-3-dodecene, 8,9-dimethyltetracyclo[4.4.0.1$^{2.5}$.1$^{7.10}$]-3-dodecene, 7,10-dimethyltetracyclo[4.4.0.1$^{2.5}$.1$^{7.10}$]-3-dodecene, 8-ethyl-9-methyltetracyclo[4.4.0.1$^{2.5}$.1$^{7.10}$]-3-dodecene, 11,12-dimethyltetracyclo[4.4.0.1$^{2.5}$.1$^{7.10}$]-3-dodecene, 7,8,9-trimethyltetracyclo

[4.4.0.1$^{2.5}$.1$^{7.10}$]-3-dodecene, 7,8-dimethyl-9-ethyltetracyclo[4.4.0.1$^{2.5}$.1$^{7.10}$]-3-dodecene, 9-isobutyl-7,8-dimethyltetracyclo[4.4.0.1$^{2.5}$.1$^{7.10}$]-3-dodecene, 8,9,12-trimethyltetracyclo[4.4.0.1$^{2.5}$.1$^{7.10}$]-3-dodecene, 9-ethyl-8,12-dimethyltetracyclo[4.4.0.1$^{2.5}$.1$^{7.10}$]-3-dodecene, 9-isobutyl-8,12-dimethyltetracyclo[4.4.0.1$^{2.5}$.1$^{7.10}$]-3-dodecene, 7,8,9,10-tetramethyltetracyclo[4.4.0.1$^{2.5}$.1$^{7.10}$]-3-dodecene, 8-ethylidenetetracyclo[4.4.0.1$^{2.5}$.1$^{7.10}$]-3-dodecene, 8-ethylidene-9-methyltetracyclo[4.4.0.1$^{2.5}$.1$^{7.10}$]-3-dodecene, 8-ethylidene-9-isopropyltetracyclo [4.4.0.1$^{2.5}$.1$^{7.10}$]-3-dodecene, 8-ethylidene-9-butyltetracyclo [4.4.0.1$^{2.5}$.1$^{7.10}$]-3-dodecene, 8-n-propylidenetetracyclo [4.4.0.1$^{2.5}$.1$^{7.10}$]-3-dodecene, 8-n-propylidene-9-methyl tetracyclo[4.4.0.1$^{2.5}$.1$^{7.10}$]-3-dodecene, 8-n-propylidene-9-ethyltetracyclo[4.4.0.1$^{2.5}$.1$^{7.10}$]-3-dodecene, 8-n-propylidene-9-isopropyltetracyclo[4.4.0.1$^{2.5}$.1$^{7.10}$]-3-dodecene, 8-n-propylidene-9-butyltetracyclo[4.4.0.1$^{2.5}$.1$^{7.10}$]-3-dodecene, 8-isopropylidenetetracyclo[4.4.0.1$^{2.5}$.1$^{7.10}$]-3-dodecene, 8-isopropylidene-9-methyltetracyclo [4.4.0.1$^{2.5}$.1$^{7.10}$]-3-dodecene, 8-isopropylidene-9-ethyltetracyclo[4.4.0.1$^{2.5}$.1$^{7.10}$]-3-dodecene, 8-isopropylidene-9-isopropyltetracyclo[4.4.0.1$^{2.5}$.1$^{7.10}$]-3-dodecene, 8-isopropylidene-9-butyltetracyclo [4.4.0.1$^{2.5}$.1$^{7.10}$]-3-dodecene, 8-phenyl-tetracyclo [4.4.0.1$^{2.5}$.1$^{7.10}$]-3-dodecene, 8-methyl-8-phenyl-tetracyclo [4.4.0.1$^{2.5}$.1$^{7.10}$]-3-dodecene, 8-benzyl-tetracyclo [4.4.0.1$^{2.5}$.1$^{7.10}$]-3-dodecene, 8-tolyl-tetracyclo [4.4.0.1$^{2.5}$.1$^{7.10}$]-3-dodecene, 8-(ethylphenyl)-tetracyclo [4.4.0.1$^{2.5}$.1$^{7.10}$]-3-dodecene, 8-(isopropylphenyl)-tetracyclo[4.4.0.1$^{2.5}$.1$^{7.10}$]-3-dodecene, 8,9-diphenyl-tetracyclo [4.4.0.1$^{2.5}$.1$^{7.10}$]-3-dodecene, 8-(biphenyl)-tetracyclo[4.4.0.1$^{2.5}$.1$^{7.10}$]-3-dodecene, 8-(β-naphthyl) tetracyclo[4.4.0.1$^{2.5}$.1$^{7.10}$]-3-dodecene, 8-(α-naphthyl) tetracyclo[4.4.0.1$^{2.5}$.1$^{7.10}$]-3-dodecene, 8-(anthracenyl)-tetracyclo[4.4.0.1$^{2.5}$.1$^{7.10}$]-3-dodecene and the like tetracyclo[4.4.0.1$^{2.5}$.1$^{7.10}$]-3-dodecene derivatives.

Examples of the pentacyclo compound include pentacyclo [6.5.1.1$^{3.6}$.0$^{2.7}$.0$^{9.13}$]-4-pentadecene, 10,11-dimethylpentacyclo[6.5.1.1$^{3.6}$.0$^{2.7}$.0$^{9.13}$]-4-pentadecene, 1,6-dimethylpentacyclo[6.5.1.1$^{3.6}$.0$^{2.7}$.0$^{9.13}$]-4-pentadecene, 10,12-dimethylpentacyclo[6.5.1.1$^{3.6}$.0$^{2.7}$.0$^{9.13}$]-4-pentadecene, 10,12-benzo-pentacyclo[6.5.1.1$^{3.6}$.0$^{2.7}$.0$^{9.13}$]-4-pentadecene and the like pentacyclo[6.5.1.1$^{3.6}$.0$^{2.7}$.0$^{9.13}$]-4-pentadecene derivatives; pentacyclo[7.4.0.1$^{2.5}$.1$^{9.12}$.0$^{8.13}$]-3-pentadecene, methyl-substituted pentacyclo [7.4.0.1$^{2.5}$.1$^{9.12}$.0$^{8.13}$]-3-pentadecene and the like pentacyclo [7.4.0.1$^{2.5}$.1$^{9.12}$.0$^{8.13}$]-3-pentadecene derivatives; pentacyclo [6.5.1.1$^{3.6}$.0$^{2.7}$.0$^{9.13}$]-4,10-pentadecadiene and the like pentacyclo[6.5.1.1$^{3.6}$.0$^{2.7}$.0$^{9.13}$]-4,10-pentadecadiene derivatives; pentacyclo[8.4.0.1$^{2.56}$.1$^{9.12}$.0$^{8.13}$]-3-hexadecene, 10-methyl-pentacyclo[8.4.0.1$^{2.56}$.1$^{9.12}$.0$^{8.13}$]-3-hexadecene, 10-ethyl-pentacyclo[8.4.0.1$^{2.56}$.1$^{9.12}$.0$^{8.13}$]-3-hexadecene, 10,11-dimethyl-pentacyclo [8.4.0.1$^{2.56}$.1$^{9.12}$.0$^{8.13}$]-3-hexadecene and the like pentacyclo [8.4.0.1$^{2.56}$.1$^{9.12}$.0$^{8.13}$]hexadecene derivatives; pentacyclo [6.6.1.1$^{3.6}$.0$^{2.7}$.0$^{9.14}$]-4-hexadecene, 10,11-dimethylpentacyclo[6.6.1.1$^{3.6}$.0$^{2.7}$.0$^{9.14}$]-4-hexadecene, 11,12-dimethylpentacyclo[6.6.1.1$^{3.6}$.0$^{2.7}$.0$^{9.14}$]-4-hexadecene, 15,16-dimethylpentacyclo[6.6.1.1$^{3.6}$.0$^{2.7}$.0$^{9.14}$]-4-hexadecene, 11,12-benzo-pentacyclo[6.6.1.1$^{3.6}$.0$^{2.7}$.0$^{9.14}$]-4-hexadecene and the like pentacyclo[6.6.1.1$^{3.6}$.0$^{2.7}$.0$^{9.14}$]-4-hexadecene derivatives.

Examples of the hexacyclo compound include hexacyclo [6.6.1.1$^{3.6}$.1$^{10.13}$.0$^{2.7}$.0$^{9.14}$]-4-heptadecene, 11-methyl-hexacyclo[6.6.1.1$^{3.6}$.1$^{10.13}$.0$^{2.7}$.0$^{9.14}$]-4-heptadecene, 11-ethylhexacyclo[6.6.1.1$^{3.6}$.1$^{10.13}$.0$^{2.7}$.0$^{9.14}$]-4-heptadecene, 11-isobutylhexacyclo[6.6.1.1$^{3.6}$.1$^{10.13}$.0$^{2.7}$.0$^{9.14}$]-4-heptadecene, 1,6,10-trimethyl-12-isobutylhexacyclo [6.6.1.1$^{3.6}$.1$^{10.13}$.0$^{2.7}$.0$^{9.14}$]-4-hexadecene, 11-phenyl-hexacyclo[6.6.1.1$^{3.6}$.1$^{10.13}$.0$^{2.7}$.0$^{9.14}$]-4-heptadecene and the like hexacyclo[6.6.1.1$^{3.6}$.1$^{10.13}$.0$^{2.7}$.0$^{9.14}$]-4-heptadecene derivatives.

Examples of the heptacyclo compound include heptacyclo [8.7.0.1$^{2.9}$.1$^{4.7}$.1$^{11.17}$.0$^{3.8}$.0$^{12.16}$]-5-eicosene, 14,15-benzo-heptacyclo[8.7.0.1$^{2.9}$.1$^{4.7}$.1$^{11.17}$.0$^{3.8}$.0$^{12.16}$]-5-eicosene and the like heptacyclo[8.7.0.1$^{2.9}$.1$^{4.7}$.1$^{11.17}$.0$^{3.8}$.0$^{12.16}$]-5-eicosene derivatives.

In the condensed ring compounds, bicyclo compounds and tricyclo compounds are preferred, bicyclo compounds and tetracyclo[4.4.1$^{2.5}$.1$^{7.10}$]-3-dodecene derivatives are more preferred, bicyclo compounds are most preferred.

Moreover, among bicyclo compounds, bicyclo[2.2.1]hept-2-ene derivatives are particularly preferred, and bicyclo [2.2.1]hept-2-ene is especially preferred.

The content of the alicyclic structural unit in the polyvinyl alcohol type resin of the invention is generally from 0.1 to 40% by mol, preferably from 0.2 to 35% by mol, particularly preferably from 0.5 to 30% by mol, based on the total amount of monomer structural units in the resin.

[Ethylene Structural Unit]

It is desirable to copolymerize the PVA type resin of the invention particularly with ethylene, because its melt forming becomes easy due to reduction of crystallinity of the copolymer and its melting point. The content of the ethylene structural unit in the resin based on the total amount of monomer structural units in the resin is generally from 1 to 70% by mol, preferably from 10 to 60% by mol, particularly preferably from 25 to 50% by mol.

In addition, the PVA type resin of the invention may be copolymerized with generally 10% by mol or less, of a copolymerizable ethylenic unsaturated monomer other than ethylene, within such a range that it does not spoil the gist of the invention.

Examples of such a monomer include propylene, 1-butene, isobutene and the like olefins; acrylic acid, methacrylic acid, crotonic acid, (anhydrous) phthalic acid, (anhydrous) maleic acid, (anhydrous) itaconic acid and the like unsaturated acids, salts thereof or their mono- or dialkyl esters having from 1 to 18 carbon atoms; acrylamide, N-alkyl acrylamide having from 1 to 18 carbon atoms, N,N-dimethylacrylamide, 2-acrylamide propanesulfonic acid or a salt thereof, acrylamide propyl dimethylamine, a salt thereof or a quaternary salt thereof and the like acrylamides; methacrylamide, N-alkyl methacrylamide having from 1 to 18 carbon atoms, N,N-dimethylmethacrylamide, 2-methacrylamide propanesulfonic acid or a salt thereof, methacrylamide propyl dimethylamine, a salt thereof or a quaternary salt thereof and the like methacrylamides; N-vinylpyrrolidone, N-vinylformamide, N-vinylacetamide and the like N-vinylamides; acrylonitrile, methacrylonitrile and the like vinyl cyanides; alkyl vinyl ether having from 1 to 18 carbon atoms, hydroxyalkylvinyl ether, alkoxyalkylvinyl ether and the like vinyl ethers; vinyl chloride, vinylidene chloride, vinyl fluoride, vinylidene fluoride, vinyl bromide and the like vinyl halides; vinyltrimethoxysilane, vinyl methyldimethoxysilane, vinyltrimethoxysilane and the like vinylsilanes; allyl acetate; allyl chloride; allyl alcohol; dimethylallyl alcohol; trimethyl-(3-acrylamide-3-dimethylpropyl)-ammonium chloride; acrylamide-2-methylpropanesulfonic acid.

In addition, it is desirable also to have a structural unit derived from an ethylenic unsaturated monomer in which the carbon of the vinyl structural moiety of ethylene which may have an organic group is bonded with the carbon of the 1,2-diol structural moiety directly or via a linking chain, namely the following structural unit (1).

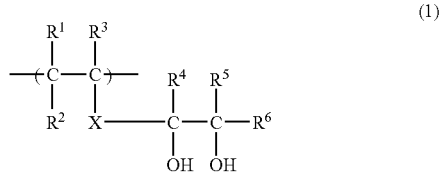

In the structural unit (1), each of $R^1$ to $R^3$ and $R^4$ to $R^6$ independently represents hydrogen atom or an organic group, and X represents single bond or a linking chain. When each of $R^1$ to $R^3$ and $R^4$ to $R^6$ of the structural unit (1) is an organic group, the organic group is not particularly limited, but for example, methyl group, ethyl group, n-propyl group, isopropyl group, n-butyl group, isobutyl group, tert-butyl group or the like alkyl group having from 1 to 4 carbon atoms is desirable, and it may have halogen atom, hydroxyl group, ester group, carbonate group, sulfonate group or the like substituent group as occasion demands.

When X of the structural unit (1) is a linking chain, any linking chain can be used with no particular limitation, and its examples include non-aromatic hydrocarbon chains, aromatic hydrocarbon chains, —CO—, —COCO—, —CO$(CH_2)_m$CO—, —CO$(C_6H_4)$CO—, —S—, —CS—, —SO—, —$SO_2$—, —NR—, —CONR—, —NRCO—, —CSNR—, —NRCS—, —NRNR—, —$HPO_4$—, —Si$(OR)_2$—, —OSi$(OR)_2$—, —OSi$(OR)_2$O—, —Ti$(OR)_2$—, —OTi$(OR)_2$—, —OTi$(OR)_2$O—, —Al(OR)—, —OAl(OR)—, —OAl(OR)O— and the like, wherein R is each independently an optional substituent group, wherein hydrogen atom or an alkyl group is preferable, and m is a natural number.

The non-aromatic hydrocarbon chains include alkylene, alkenylene, alkynylene and the like, and the aromatic hydrocarbon chains include phenylene, naphthylene and the like. These non-aromatic hydrocarbon chains and aromatic hydrocarbon chains may have a substituent group such as fluorine, chlorine, bromine or the like.

Among them, a non-aromatic hydrocarbon chain, particularly an alkylene, is desirable from the viewpoint of thermal stability. As such an alkylene, those which have small number of carbons are desirable, and for example, those having 6 carbon atoms or less are suitably used.

As the ethylene derivative which forms the structural unit (1), when X is single bond for example, 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene and the like can be exemplified, and when X is an alkylene group, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene and the like can be exemplified. Preferred among them is 3,4-dihydroxy-1-butene wherein all of $R^1$ to $R^4$ in the structural unit (1) is hydrogen atom and X is single bond. In addition, one species or two or more species of the ethylene and ethylenic unsaturated monomers exemplified in the above may be simultaneously copolymerized.

Saponification degree of the polyvinyl alcohol type resin of the invention is generally 90% by mol or more, preferably 95% by mol or more, particularly preferably 99% by mol or more.

Average polymerization degree of the PVA type resin of the invention (measured in accordance with JIS K 6726) is generally from 100 to 4,000, preferably from 150 to 2,600, particularly preferably from 200 to 2,200.

Glass transition point (Tg) of the PVA type resin of the invention is generally from 75 to 180° C., preferably from 80 to 140° C., particularly preferably from 90 to 120° C. Also, glass transition point (Tg) of the PVA type resin of the invention when copolymerized with ethylene is generally from 60 to 160° C., preferably from 65 to 130° C., particularly preferably from 70 to 110° C. When such a glass transition point (Tg) is high, there is a tendency to show superior gas barrio property. In this connection, the glass transition point (Tg) is a temperature when measured at the time of second temperature rising (second run) using a differential scanning calorimeter.

Next, the method for producing the PVA type resin of the invention is described. The PVA type resin of the invention is produced by copolymerizing a vinyl ester type monomer with a compound (monomer) which forms an alicyclic structural unit, and further copolymerizing this with ethylene or an ethylenic unsaturated monomer as occasion demands. Charging amounts of these monomers are optionally adjusted based on the desired copolymerization ratio.

[Copolymerization]

The copolymerization method has no particular limitation, and mass polymerization, solution polymerization, suspension polymerization, dispersion polymerization, emulsion polymerization or the like conventionally known method can be employed, but the solution polymerization is generally carried out. It's desirable that the low temperature suspension polymerization or the low temperature emulsion polymerization is carried out, when necessary to be produced for the PVA type resin of the invention with the high degree of polymerization. Also, charging method of the monomer components at the time of copolymerization is not particularly limited, and batch charging, split charging, continuous charging or the like optional method is employed. When ethylene is introduced into a copolymer, an ethylene pressure polymerization can for example be employed. It is possible to control its introducing amount by adjusting the pressure of ethylene, and though it varies depending on the desired ethylene content, the pressure is selected generally from 25 to 80 kg/cm².

As the solvent to be used in the copolymerization, generally, methanol, ethanol, propanol, butanol and the like lower alcohols and acetone, methyl ethyl ketone and the like ketones can be exemplified, and methanol is suitably used industrially. Using amount of the solvent can be optionally selected in response to the degree of polymerization of the copolymer of interest, by taking the chain transfer constant of solvent into consideration. For example, when the solvent is methanol, it is selected within the range of solvent/monomer=0.01 to 10 (mass ratio), preferably 0.05 to 3 (mass ratio).

Examples of the polymerization catalyst to be used in the copolymerization include azobisisobutyronitrile, acetyl peroxide, benzoyl peroxide, lauryl peroxide and the like conventionally known radical polymerization catalysts and azobisdimethylvaleronitrile, azobismethoxydimethylvaleronitrile and the like low temperature active radical polymerization catalysts. Using amount of the polymerization catalyst varies depending on the kind of catalyst and cannot therefore be decided in a wholesale manner, so that it is optionally selected in response to the polymerization rate. For example, when azobisisobutyronitrile or acetyl peroxide is used, it is preferably from 0.01 to 0.2% by mol, particularly preferably from 0.02 to 0.15% by mol, based on the vinyl ester type monomer.

It is desirable to set reaction temperature of the copolymerization reaction to approximately from 20° C. to boiling point, in response to the solvent and pressure to be employed.

In this connection, it is not necessary to carry out the polymerization at a constant temperature until completion of the polymerization, and, for example, it may be changed at the time of the additional charging of a saponification catalyst.

In the case of a batch system, the polymerization time is preferably from 4 to 20 hours, more preferably from 6 to 12 hours. In the case of a continuous system, average residence time in the polymerization vessel is preferably from 2 to 10 hours, more preferably from 2 to 8 hours. When the polymerization time (residence time) is too short, it becomes difficult to control the polymerization for achieving high productivity (high polymerization ratio), while there poses a problem in terms of the productivity when it is too long.

As occasion demands, the polymerization may be stopped by adding a polymerization inhibitor. The polymerization inhibitor is not particularly limited, and its examples include hydroquinone, aniline, anthracene, nitrobenzene, dinitrobenzene, trinitrobenzene, benzonitrile, benzophenone, N,N-dimethylformamide, cinnamic alcohol, cinnamic acid, sorbic acid and the like. After stopping the polymerization, unreacted monomers and the like are removed by carrying out distillation.

[Saponification]

Subsequently, the thus obtained copolymer is saponified by a batch system using a kneader or the like, or a continuous system on a belt, in a column or the like. The saponification is carried out by dissolving the copolymer obtained in the above in an alcohol or a water-containing alcohol and then using an alkali catalyst or an acid catalyst. As the alcohol, methanol, ethanol, propanol, tert-butanol and the like can be exemplified, of which methanol is particularly preferably used. Concentration of the copolymer in the alcohol is optionally selected based on the viscosity of the system and is selected from a range of generally from 10 to 60% by mass.

The catalyst to be used in the saponification is not particularly limited, and its examples include sodium hydroxide, potassium hydroxide, sodium methylate, sodium ethylate, potassium methylate, lithium methylate and the like alkali catalysts of alkali metal hydroxides and alcoholates; and sulfuric acid, hydrochloric acid, nitric acid, methanesulfonic acid, zeolite, cation exchange resin and the like acid catalysts.

Using amount of the saponification catalyst can be optionally selected in response to the saponification method, desired saponification degree and the like, but when an alkali catalyst is used, it is generally from 0.1 to 30 mmol, preferably from 2 to 17 mmol based on the total amount of fatty acid ester units.

In addition, reaction temperature of the saponification reaction is not particularly limited, but is preferably from 10 to 60° C., preferably from 20 to 50° C. The saponification reaction is carried out for a period of generally from 0.5 to 3 hours. These conditions are optionally adjusted to obtain the desired saponification degree.

After completion of the saponification, the thus obtained slurry is subjected to solid-liquid separation by a conventionally known method, washed with methyl acetate, methanol or the like, pelletized after stranding as occasion demands and then dried to obtain the PVA type resin of the invention.

When the PVA type resin of the invention is used in various applications, it may be mixed with other different PVA type resin depending on each purpose such as provision of an appropriate physical property. As such an other PVA type resin, those which have different saponification degrees, different polymerization degrees, different modification groups, different modification degrees and the like can be exemplified. In addition, it may also be mixed with an unmodified PVA type resin or EVOH for the purpose, for example, of adjusting the modification degree.

When the PVA type resin of the invention is used in various application, a lubricant, an inorganic salt (e.g., hydrotalcite or the like), a plasticizer (e.g., ethylene glycol, glycerol, hexanediol or the like aliphatic polyvalent alcohol or the like), an oxygen absorbent, a heat stabilizer, a light stabilizer, an antioxidant, a UV absorbent, a coloring agent, an antistatic agent, a surfactant, an antibacterial agent, an anti-blocking agent, a slipping agent, a filler (e.g., an inorganic filler or the like), other resin (e.g., polyolefin, polyamide or the like) and the like, may be used within such a range that they do not spoil the object of the invention.

As the lubricant, a saturated aliphatic amide (e.g., stearic acid amide or the like), an unsaturated aliphatic amide (e.g., oleic acid amide or the like), a bis-fatty acid amide (e.g., ethylenebisstearic acid amide or the like), a fatty acid metal salt (e.g., calcium stearate, magnesium stearate or the like), a low molecular weight polyolefin (e.g., a low molecular weight polyethylene or low molecular weight polypropylene having a molecular weight of approximately from 500 to 10,000 or the like) and the like can be exemplified.

As the oxygen absorbent, for example, an inorganic type oxygen absorbent, an organic compound type oxygen absorbent and a polymer type oxygen absorbent can be cited. As the inorganic type oxygen absorbent, reduced iron powders, those in which a water absorbing substance, an electrolyte and the like are added thereto, aluminum powder, potassium sulfite, a photocatalyst titanium oxide and the like can be exemplified. As the organic compound type oxygen absorbent, ascorbic acid, its fatty acid ester and metal salt and the like; hydroquinone, gallic acid, hydroxide group-containing phenol aldehyde resin and the like polyvalent phenols; coordinate bond products of bis-salicylaldehydeimine cobalt, tetraethylenepentamine cobalt, cobalt-Schiff base complex, porphyrins, large ring polyamine complex, polyethyleneimine-cobalt complex and the like nitrogen-containing compounds with transition metals; terpene compounds; reaction products of amino acids with hydroxyl group-containing reducing substances; triphenylmethyl compounds and the like can be exemplified. As the polymer type oxygen absorbent, a coordinate bond product of a nitrogen-containing resin with a transition metal (e.g., a combination of MXD nylon and cobalt), a blended product of a tertiary hydrogen-containing resin with a transition metal (e.g., a combination of polypropylene and cobalt), a blended product of a carbon-carbon unsaturated bond-containing resin and a transition metal (e.g., a combination of polybutadiene and cobalt), a photo-oxidation disintegration type resin (e.g., polyketone), an anthraquinone polymer (e.g., polyvinylanthraquinone), a product in which a photo-initiator (benzophenone or the like), a peroxide trapping agent (a commercially available antioxidant or the like), a deodorant (activated carbon or the like) and the like are added to such a blended product and the like can be exemplified.

In addition, from the viewpoint of improving heat stability of the resin, it is desirable to add acetic acid, phosphoric acid and the like acids or their metal salts such as an alkali metal, an alkaline earth metal, a transition metal and the like, or a boron compound such as a boric acid and a salt thereof, to the PVA type resin of the invention within such a range that they do not spoil the object of the invention.

Amount of acetic acid to be added is preferably from 0.001 to 1 part by weight (more preferably from 0.005 to 0.2 part by weight, particularly preferably from 0.010 to 0.1 part by weight) based on 100 parts by weight of the PVA type resin, and its containing effect cannot be sufficiently obtained in some cases when the adding amount is less than 0.001 part by weight, while there is a tendency to worsen appearance of the obtained moldings when it exceeds 1 part by weight, so that both of these cases are not desirable.

Examples of the metal salt include salts of sodium, potassium, calcium, magnesium and the like metals with acetic acid, propionic acid, butyric acid, lauric acid, stearic acid, oleic acid, behenic acid and the like organic acids or sulfuric acid, sulfurous acid, carbonic acid, phosphoric acid and the like inorganic acids. In addition, amount of said metal salt to be added is preferably from 0.0005 to 0.01 part by weight (more preferably from 0.001 to 0.05 part by weight, particularly preferably from 0.002 to 0.03 part by weight), as metal, based on 100 parts by weight of the PVA type resin, and its containing effect cannot be sufficiently obtained in some cases when the adding amount is less than 0.0005 part by weight, while there is a tendency to worsen appearance of the obtained moldings when it exceeds 0.01 part by weight, so that both of these cases are not desirable. In this connection, when two or more species of alkali metal and/or alkaline earth metal salts are added to the PVA type resin, it is desirable that their total amount is within the aforementioned range of adding amount.

Examples of the boric acid metal salt include calcium borate, cobalt borate, zinc borate (e.g., zinc tetraborate, zinc metaborate or the like), aluminum potassium borate, ammonium borate (e.g., ammonium metaborate, ammonium tetraborate, ammonium pentaborate, ammonium octaborate or the like), cadmium borate (e.g., cadmium orthoborate, cadmium tetraborate or the like), potassium borate (e.g., potassium metaborate, potassium tetraborate, potassium pentaborate, potassium hexaborate, potassium octaborate or the like), silver borate (e.g., silver metaborate, silver tetraborate or the like), copper borate (e.g., cupric borate, copper metaborate, copper tetraborate or the like), sodium borate (e.g., sodium metaborate, sodium diborate, sodium tetraborate, sodium pentaborate, sodium hexaborate, sodium octaborate or the like), lead borate (e.g., lead metaborate, lead hexaborate or the like), nickel borate (e.g., nickel orthoborate, nickel diborate, nickel tetraborate, nickel octaborate or the like), barium borate (e.g., barium orthoborate, barium metaborate, barium diborate, barium tetraborate or the like), bismuth borate, magnesium borate (e.g., magnesium orthoborate, magnesium diborate, magnesium metaborate, trimagnesium tetraborate, pentamagnesium tetraborate or the like), manganese borate (e.g., manganous borate, manganese metaborate, manganese tetraborate or the like) and lithium borate (e.g., lithium metaborate, lithium tetraborate, lithium pentaborate or the like), as well as borax, cahnite, inyoite, kotoite, suanite, szaibelyite and the like borate minerals and the like, of which borax, boric acid and sodium borate (e.g., sodium metaborate, sodium diborate, sodium tetraborate, sodium pentaborate, sodium hexaborate, sodium octaborate or the like) are preferred. Amount of the boron compound to be added is preferably from 0.001 to 1 part by weight (more preferably from 0.002 to 0.2 part by weight, particularly preferably from 0.005 to 0.1 part by weight), as boron, based on 100 parts by weight of the PVA type resin in the composition, and its containing effect cannot be sufficiently obtained in some cases when the adding amount is less than 0.001 part by weight, while there is a tendency to worsen appearance of the obtained moldings when it exceeds 1 part by weight, so that both of these cases are not desirable.

[Film]

Since the PVA type resin of the invention shows high gas barrier property even under a high humidity condition, it can be suitably applied to a film as a packaging material for food, chemicals and the like. A film comprising the PVA type resin of the invention can be produced by a conventionally known method. For example, a method in which an aqueous solution of the PVA type resin is spread on a roll, a drum or an endless belt and dried at approximately from 80 to 130° C., a method in which a composition prepared by optionally adding water, a plasticizer, a filler and the like to the PVA type resin is melt-formed by an extrusion or the like means, and the like can be employed. In this connection, as occasion demands, an annealing treatment may be carried out after the film formation, approximately at a temperature of from 120 to 200° C. for a period of from 1 to 30 minutes.

Thickness of the PVA type resin film of the invention can be optionally decided in response to the application purpose and therefore is not particularly limited, but is generally from 0.1 to 500 μm, preferably from 0.5 to 100 μm.

The PVA type resin film of the invention is markedly useful from the viewpoint that it can be applied to various types of packaging material as a monolayer film or sheet. However, when a laminate that comprises at least one layer comprising the PVA type resin of the invention is formed by further laminating one or two or more layers of other resin layers, it is desirable from the viewpoint that reduction of gas barrier property can be controlled under further high humidity condition, and the mechanical strength is increased.

In producing such a laminate, for example, a base material comprising a thermoplastic resin is laminated on one or both sides of a layer comprising the PVA type resin of the invention. Examples of such a laminating method include (A) a dry laminating method in which a film or sheet containing a thermoplastic resin and a film or sheet containing the PVA type resin of the invention are pasted together using an isocyanate compound, a polyester type compound, a polyurethane compound or the like conventionally known adhesive resin, (B) a melt extrusion laminating method in which a thermoplastic resin is melt-extruded on a film or sheet containing the PVA type resin of the invention, (C) a method in which the PVA type resin of the invention and a thermoplastic resin are co-extruded and (D) a coating method in which a coat is formed by applying a solution containing the PVA type resin of the invention to the layer of a thermoplastic resin, and drying the solution by evaporating moisture by hot air blowing, ultraviolet ray irradiation or the like means.

Examples of such a thermoplastic resin to be used include straight chain low density polyethylene, low density polyethylene, medium density polyethylene, high density polyethylene, ethylene-vinyl acetate copolymer, ethylene-vinyl acetate copolymer saponification product, ionomer, ethylene-propylene copolymer, ethylene-acrylic acid ester copolymer, ethylene-acrylate copolymer, polypropylene, propylene-α-olefin (α-olefin having from 4 to 20 carbon atoms) copolymer, polybutene, polypentene and the like olefin homo- or copolymers, or those in which these olefin homo- or copolymers are graft-modified with an unsaturated carboxylic acid or an ester thereof or chlorinated, and the like polyolefin type resins in a broad sense; polyethylene terephthalate (PET) and the like polyesters; nylon 6, nylon 66, nylon 12 and the like polyamides; nylon 6.66 copolymer, nylon 6.12 copolymer and the like copolymer polyamides; polyvinyl chloride; polyvinylidene chloride; acryl type resins; polystyrene type resins; vinyl ester type resins; polyester elastomer, polyurethane elastomer and the like elastomers; and polyphenylene sulfide and the like.

In addition, a sheet of paper, metal, wood, cloth, nonwoven fabric or the like base material can also be used as one or two or more layers which constitute the laminate. Preferred are non-oriented, monoaxially oriented or biaxially oriented resin films or sheets of the aforementioned thermoplastic resins, and films or sheets in which an inorganic substance is deposited thereon. Heat sealing property and the like functions can also be provided by the use of thermoplastic resin base materials.

It is desirable to apply various types of surface treatment to such base materials. Examples of the surface treatment include a corona discharge treatment, an etching treatment with a solvent, a spattering treatment, a chromic acid treatment, a high frequency treatment and the like and a surface treatment as a combination thereof. In addition, arrangement of an anchor layer by the application or dry lamination of an adhesive resin is also desirable in view of further improving interlayer adhesion. As such an adhesive resin, a polyurethane type resin, a polyester type resin, an alkyl titanate type resin, a polybutadiene type resin, a polyethyleneimine type resin and the like can for example be cited.

Regarding the layer constitution of laminate, when the layer of the PVA type resin of the invention is regarded as X (X1, X2, . . . ), and the other base material such as a thermoplastic resin layer as Y (Y1, Y2 . . . ), not only the two layer construction of X/Y but also Y/X/Y, X/Y/X, X1/X2/Y, X/Y1/Y2, Y2/Y1/X/Y1/Y2, Y2/Y1/X/Y1/X/Y1/Y2 and the like optional combinations can be employed in the case of a film, a sheet, a bottle and the like. A conventionally known adhesive resin can be used in such an interlayer as occasion demands. In this connection, when two or more of thermoplastic resin layers are laminated, not only the layers consisting of the same thermoplastic resin but also the layers consisting of different thermoplastic resins can be laminated.

Thickness of the PVA type resin layer of the invention in such a laminate is the same as the aforementioned case. Thickness of the base material in the laminate varied depending on the intended gas barrier performance, kind of the base material, layer constitution and the like, is generally from 0.1 to 1,000 μm, preferably from 1 to 500 μm. By the use of the PVA type resin of the invention, thickness of the laminate can be further thinned and a laminate having excellent gas barrier property can be obtained, in comparison with the conventional gas barrier resin-aided laminates. Thickness of the laminate is generally from 5 to 5,000 μm, preferably from 10 to 1,000 μm. When the thickness is too thin, the product shows a tendency of reducing its mechanical strength and productivity, while it shows a tendency of reducing flexibility when too thick on the contrary.

In addition, it is also desirable to apply a conventionally known stretching treatment to the monolayer film and laminate having the PVA type resin of the invention as occasion demands, from the viewpoint of improving gas barrier property.

EXAMPLES

The following describes the embodiments of the invention further illustratively with reference to inventive and comparative examples, though the invention is not limited to the following examples with the proviso that they do not overstep its scope. In this connection, measuring methods of respective physical properties are as follows.

[Glass Transition Point]

Using a differential scanning calorimeter (mfd. by Perkin-Elmer Japan), 10 mg of each sample was measured at a programming rate of 10° C./minutes between −30° C. and 230° C., and the temperature of second run was used as the glass transition temperature (° C.).

[Gas Barrier Property]

Oxygen transmission rate (OTR, cc·4 μm/m²·day·atm) was measured using an oxygen transmission rate analyzer ("OXT-RAN" mfd. by MOCON) under conditions of 23° C. in temperature and 80% RH in humidity.

Inventive Example 1

A reaction container equipped with a reflux condenser, a dropping funnel and an agitator was charged with 352 part by mass of vinyl acetate, 35 part by mass of methanol and 52 part by mass of bicyclo[2.2.1]hept-2-ene (norbornylene), 0.12% by mol of azobisisobutyronitrile (based on the charged vinyl acetate) was added thereto, and polymerization was carried out by raising the temperature in a stream of nitrogen while stirring the contents.

Thereafter, when the polymerization ratio of vinyl acetate reached 61%, the polymerization was completed by charging 20 ppm (based on the charged vinyl acetate) of m-dinitrobenzene as the polymerization inhibitor. Subsequently, a methanol solution of the copolymer was obtained by removing unreacted vinyl acetate monomer from the system by a methanol vapor-blowing method.

Next, said solution was diluted with methanol to adjust its concentration to 40% by mass, and saponification was carried out by adding a 2% by mass methanol solution of sodium hydroxide at a ratio of 8 mmol % based on the total amount of vinyl acetate in the copolymer. As the saponification progressed, a saponified product was precipitated and finally became particles. The thus formed PVA particles were collected by filtration, washed thoroughly with methanol and dried in a hot air drier to obtain a PVA type resin. Structural unit of the thus obtained PVA type resin is shown in the following structural unit (2).

Average polymerization degree of the thus obtained PVA type resin was 240 when its analysis was carried out in accordance with JIS K 6726. In addition, introduced amount of bicyclo[2.2.1]hept-2-ene in the aforementioned PVA type resin was measured by 1H-NMR (internal standard: tetramethylsilane, solvent: $d_6$-DMSO) and calculated by the following method. A chart thereof is shown in FIG. 1. The introduced amount calculated from the measured results was 6% by mol based on the total amount of vinyl alcohol and norbornylene structural units in the aforementioned PVA type resin. In this connection, "UNITY-300" manufactured by Varian was used in the NMR measurement.

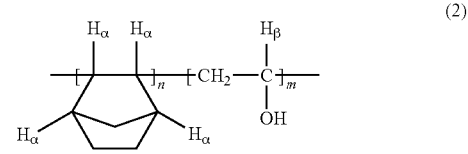

[¹H-NMR]

1.82-2.40 ppm: methine proton ($H\alpha$ in the aforementioned structural unit (2), integral value a in FIG. 1)

3.45-3.98 ppm: methine proton ($H\beta$ in the aforementioned structural unit (2), integral value b in FIG. 1)

[Calculation Method]

Since the methine derived from bicyclo[2.2.1]hept-2-ene was assigned to 1.8-2.4 ppm, and 4 protons were present, integral value of 1 proton was a/4. On the other hand, since methine of the main chain was assigned to 3.4-3.95 ppm, introduced amount of bicyclo[2.2.1]hept-2-ene was calculated from a formula, introduced amount (% by mol)={(a/4)÷(b+a/4)}×100.

A 10% by mass solution of the thus obtained modified PVA type resin (solvent: water/methanol=80/20) was prepared and coated on a polyethylene terephthalate film (25 μm in thickness), wherein its surface had been corona-treated, to a dry thickness of 4 μm using an applicator. After formation of a coat by drying, said coat was subjected to an annealing treatment (120° C.×5 minutes) to obtain an alicyclic structural unit-containing PVA type monolayer film, and the evaluation in view of Glass transition point (Tg) and Gas barrier property (OTR) was carried out. Physical properties of this alicyclic structural unit-containing PVA type film are summarized in Table 1.

Comparative Example 1

Using a polyvinyl alcohol having an average polymerization degree of 1,300 and a saponification degree of 99.2% by mol, a film was obtained in the same manner as in Inventive Example 1 and the same evaluation was carried out. Physical properties of this PVA film are summarized in Table 1.

Comparative Example 2

Using an ethylene-vinyl alcohol copolymer having an ethylene content of 44% by mol and an MFR (melt flow rate) of 12 g/10 minutes, a film was obtained in the same manner as in Inventive Example 1 and the same evaluation was carried out. Physical properties of this EVOH film are summarized in Table 1.

TABLE 1

|  | Kinds of resin | Tg | OTR |
| --- | --- | --- | --- |
| Inventive Example 1 | Alicyclic structural unit-containing PVA type resin | 95 | 7.2 |
| Comparative Example 1 | PVA resin | 74 | 35 |
| Comparative Example 2 | EVOH resin | 55 | 17 |

Since the PVA type resin of the invention shows good gas barrier property not only under a dry condition but also under a high humidity condition, a film produced using this resin is useful as a food packaging material, a medicine packaging material, an industrial drug packaging material, an agricultural chemical packaging material and the like various packaging materials, even when it is a monolayer film. In addition, when a laminate that comprises at least one layer comprising the PVA type resin of the invention is formed by further laminating one or two or more layers of other resin layers, reduction of gas barrier property can be controlled under more higher humidity condition, and the mechanical strength is increased, so that this product is suitable as a packaging material for an article whose quality could be deteriorated by oxygen.

What is claimed is:

1. A polyvinyl alcohol resin, which comprises: a vinyl alcohol structural unit; and an alicyclic structural unit containing an alicyclic structure in the main chain.

2. The polyvinyl alcohol resin according to claim 1, wherein the alicyclic structural unit is a bicyclo compound unit.

3. The polyvinyl alcohol resin according to claim 1, wherein the carbon number of the alicyclic structural unit is from 3 to 20.

4. The polyvinyl alcohol resin according to claim 1, wherein a ring having the smallest carbon number in the alicyclic structural unit is 3- to 10-membered ring.

5. The polyvinyl alcohol resin according to claim 1, wherein the alicyclic structural unit is a structural unit derived from bicyclo[2.2.1]hept-2-ene.

6. The polyvinyl alcohol resin according to claim 1, wherein the content of the alicyclic structural unit in the resin is from 0.1 to 40% by mol based on the total amount of monomer structural units in the resin.

7. The polyvinyl alcohol resin according to claim 1, which further comprises an ethylene structural unit.

8. The polyvinyl alcohol resin according to claim 7, wherein the content of the ethylene structural unit in the resin is from 1 to 70% by mol based on the total amount of monomer structural units in the resin.

9. A monolayer film, which comprises the polyvinyl alcohol resin according to claim 1.

10. A laminate which comprises at least one layer comprising the polyvinyl alcohol resin according to claim 1.

* * * * *